(12) United States Patent
Worth et al.

(10) Patent No.: US 8,285,269 B2
(45) Date of Patent: Oct. 9, 2012

(54) STATISTICAL SPAM MESSAGE DETECTION

(75) Inventors: Nicholas William John Worth, Markham (CA); John Joseph Hurley, London (GB)

(73) Assignee: Airwide Solutions UK Ltd., Reading Berks (GB)

( * ) Notice: Subject to any disclaimer, the term of this patent is extended or adjusted under 35 U.S.C. 154(b) by 0 days.

(21) Appl. No.: 12/994,948

(22) PCT Filed: Jun. 2, 2008

(86) PCT No.: PCT/EP2008/056755
§ 371 (c)(1),
(2), (4) Date: Feb. 14, 2011

(87) PCT Pub. No.: WO2009/146732
PCT Pub. Date: Dec. 10, 2009

(65) Prior Publication Data
US 2011/0130127 A1    Jun. 2, 2011

(51) Int. Cl.
*H04M 3/00* (2006.01)
(52) U.S. Cl. ......... 455/418; 455/411; 455/445; 709/206
(58) Field of Classification Search .................. 455/418, 455/411, 445; 709/206
See application file for complete search history.

(56) References Cited

U.S. PATENT DOCUMENTS

| | | | |
|---|---|---|---|
| 2004/0236836 A1* | 11/2004 | Appelman et al. | 709/206 |
| 2005/0048991 A1* | 3/2005 | Hertz | 455/466 |
| 2007/0226297 A1 | 9/2007 | Dayan et al. | |
| 2009/0089877 A1* | 4/2009 | Bolinger et al. | 726/22 |

FOREIGN PATENT DOCUMENTS

| | | |
|---|---|---|
| EP | 1628448 | 2/2006 |
| WO | WO2005091656 | 9/2005 |

* cited by examiner

*Primary Examiner* — Danh Le
(74) *Attorney, Agent, or Firm* — Shalom Wertsberger; Saltamar Innovations

(57) ABSTRACT

A mobile telecommunication network monitors short messages and multimedia messages sent to non-existent mobile subscribers and selectively treats such messages as if sent to an existent recipient. The network then provides the sender with ordinary signaling related to successful message delivery so as to form traps to attract and detect messages such as spam messages. Spam messages are detectable as statistically significant presence of identical or sufficiently similar messages in a sufficiently large subset of unused subscriber numbers being assigned as traps for spam messages. The treatment of messages addressed to numbers assigned to trap use can further model normal usage of mobile subscriptions so as to inhibit simple determination of subscriber numbers that are used for trapping spam messages.

23 Claims, 2 Drawing Sheets

STATISTICAL SPAM MESSAGE DETECTION

FIELD OF THE INVENTION

The present invention generally relates to statistical spam message detection. More particularly, though not exclusively, the invention relates to capturing a proportion of messages sent to addresses that are not currently allocated to mobile subscribers.

BACKGROUND OF THE INVENTION

The internet has become a powerful information delivery tool in which a host of useful information is accessible in various services. However, the efficiency of Internet also enables some adverse abuse such as so-called spamming in which various unsolicited messages are sent to millions of recipients. Spamming is particularly undesirable because it floods email inboxes, exposes recipients to computer virus and worm attacks and hinders normal communications as desired messages may be accidentally removed or discarded among spam messages. Often spamming is performed by using hijacked computers so each of which may send thousands of unsolicited messages using a list of public email addresses and/or using a private address book stored.

There are naturally numerous ways to counter spamming, including client based spam filters which try to detect spam messages based on some heuristic analysis and mail server based spam filters which may be configured to identify suspicious messages spreading in a spam like manner. In order to enhance the reliability of detecting unsolicited messages, the operators may establish and suitably publish in the internet email addresses for the purpose of attracting and detecting spam messages. Such traps should only receive unsolicited messages, since they are not provided to anyone for any real solicited messaging. Matching messages sent to other subscribers of an email service provider should also be unsolicited messages and thus safely removable. With the email, this is an efficient technique with little if any downsides.

While spam is considered a nuisance in the computer world, when targeted at mobile telephones, it is perceived as an even greater intrusion because consumers perceive their handsets as more personal devices than their PCs. For a time, the cost and technology of SMS and MMS messaging represented a barrier to mobile spam but the emergence of mobile Spoof and Fake techniques enabled spammers to disguise the source of their attacks and avoid being billed. In addition to the nuisance value, because there is a monitory cost associated with each mobile message (that rarely applies to email), such spam threatens the revenue streams of mobile operators. Various applications have been developed to detect and remove messages that use Spoof and Fake techniques. However, a certain proportion of spam messages can only be detected by examining their content, for example messages Spoofed through another mobile network's SMSC. The trend towards technical convergence between mobile telephones and computers has increased the risk of mobile phones being infected with worm viruses that turn them into spam originators. In such cases, the cost of messaging would be borne by the owner of the mobile network subscription and thus individuals may face significant phone bills for messages they did not originate.

Hence, there is a need to address spam messaging in mobile communications networks.

SUMMARY

According to a first aspect of the invention there is provided in a mobile communication network, a method for detecting spam messages in a mobile communication network, comprising:
  receiving from a sender a request for routing information to send a mobile message to a recipient, the mobile message referring to a message addressed using a subscriber number of a mobile telecommunication network;
  detecting whether or not the recipient is a valid subscriber of the mobile communication network and:
    if the recipient is not a valid subscriber of the mobile communication network, then:
      simulating to the sender that the recipient is indeed a valid subscriber in order to provoke the sender to send the mobile message; and
      identifying the mobile message as a suspected spam message;
    if the recipient is a valid subscriber of the mobile communication network then:
      proceeding to deliver a normal response to the request to deliver the routing information.

Advantageously, by simulating to the sender that the recipient is indeed a mobile network subscriber, non-existent phone numbers may be used to automatically capture samples of spam messages without need to reserve any phone numbers for acting as static traps. In effect, dynamic traps may be produced.

The response to the request for routing information may indicate whether the recipient is present in or absent from the mobile communication network.

Further advantageously, the method may enable detection of spam messages on their entry into a mobile communication system rather than after their routing to various different mobile communication networks. It may be more effective to examine messages sent to non-existent numbers on the entry of the messages the mobile communication system when patterns may be clearly visible to an inspecting element.

The method may further comprise selectively simulating to the sender that the recipient is indeed a mobile network subscriber based on one or more predetermined criteria.

The predetermined criteria may comprise any one or more of the following: a predetermined portion of unallocated subscriber numbers; a predetermined proportion of unallocated subscriber numbers; a predetermined portion of the requests or routing information; and a predetermined proportion of the requests for routing information.

The predetermined portion of the requests for routing information may be determined based on available processing resources. The determining of the predetermined portion of the requests for routing information may be based on desired maximum temporal rate of processed request and on available resources to perform the method of the first aspect.

The size of the predetermined portion may be set balancing between reliable detection of spam messages and avoiding false delivery reports in case of accidental misaddressing of mobile messages.

The simulating may imitate ordinary behavior of mobile subscribers.

Advantageously, by imitating ordinary behavior of mobile subscribers it may be possible to mitigate detecting such subscriptions which are used as traps for spam messages.

The predetermined portion may consist of a particular set of unallocated subscriber numbers or be dynamically defined from among the unallocated subscriber numbers.

The simulating may be configured to operate such that no charging or reduced charging is incurred to the sender when a mobile message is not delivered to an existing recipient.

The method may further comprise using the mobile message to update a message filter if the mobile message is identified as a suspected spam message.

Advantageously, a message filter may be used to screen out undesired messages based on particular filtering rules. The filtering rules may be updated using the identified suspected spam message. The filtering rules may be updated by an external service provider, in which case the identified suspected spam message or particular details of the suspected spam message may be provided to the external service provider.

The method may further comprise comparing the suspected spam message with genuine messages sent in amounts over predetermined threshold so as to verify automatically or manually whether the suspected spam message is probably a misaddressed transmission such as a vote in a Eurovision contest or the like.

Advantageously, it may be possible to white-list common mistakes either in advance or while holding suspected spam messages in a particular quarantine buffer so as to prevent valid audience responses from being subsequently treated as spam messages. The white-listing may be based on collecting frequent valid messages from ongoing message stream, from telecommunication operators, and/or TV-broadcasters. The white listing may further be based on analyzing A-subscriber number and time distribution of the messages by computing distribution characteristics and comparing the distribution characteristics to predetermined acceptable ranges.

The mobile message may be selected from a message of short messaging service, multimedia messaging service, picture messaging service or mobile instant message service. Generally, the mobile message may be addressed using a subscriber number of a mobile telecommunication network.

According to a second aspect of the invention there is provided an apparatus for detecting spam messages in a mobile communication network, comprising:
- a receiver configured to receive from a sender a request for routing information for sending a mobile message to a recipient, the mobile message referring to a message addressed using a subscriber number of a mobile telecommunication network;
- a processor configured to detect whether the recipient is an existing mobile communication network subscriber and:
  - if the recipient is not a valid subscriber of the mobile communication network, to simulate to the sender that the recipient is indeed a mobile communication network subscriber in order to provoke the sender to send the mobile message and to identify the mobile message as a suspected spam message;
  - if the recipient is a valid subscriber of the mobile communication network, to proceed with the request to deliver the mobile message a normal response to the request to deliver the routing information.

According to a third aspect of the invention there is provided a computer program stored in a computer readable medium, the computer program comprising computer executable program code adapted to cause an apparatus to implement the first aspect of the invention.

The computer executable program code of the third aspect may consist of program code executable by any one of the following: a multipurpose processor; a microprocessor; an application specific integrated circuit; a digital signal processor; and a master control processor.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

It was disclosed in the background art section that particular spam attractors (email addresses for attracting spam messages) have been used for detecting common spam email messages in the Internet. Such attractors are yet not straightforward to implement in mobile messaging, because the circumstances and environment of mobile messaging drastically differs from those in email messaging. Email addresses can consist of any combinations of alphabets, digits and some other characters such that there is an enormous name space for any domain name (such as company.com). Further still, the email addresses need not be prior registered or reserved in an external register, unlike Internet Protocol (IP) addresses, for instance. Email is delivered by means of IP packets which each carry small parts of an email message. Each IP packet has a header with data needed for routing the packets to their destination. The headers of email messages contain as a destination address only the IP address of the mail server of the domain part of an email address. For instance, if one sends an email with a spelling error in the recipient name, it is the mail server of the targeted domain that sends an error message that the recipient is not found, subject to the policy of the mail server.

Mobile messaging, such as short messaging service and multimedia messaging service, differ from the email messaging. In mobile messaging, it is a phone number that forms the destination address. Due to number transferability in which a given phone subscription may be transferred from one operator to another without change of the number, the phone does not necessarily identify the operator to whose network the number is subscribed. Hence, if the spam attractors known from email were to be applied in mobile messaging, an operator should reserve a significant proportion of its phone number space for use as spam traps in order to detect incoming spam messages. However, the amount of trap numbers might be insufficient to reliably identify spam messages, as normal users sometimes send short messages to relatively large groups of people with partly erroneous numbers (e.g. sending a message to everyone in the phone book of a mobile phone after a baby is born to the family).

Moreover, the inventors have realized that it is more efficient to detect spam messages at an entry point in which the messages enter a mobile communication network than at separate exit points in which the messages are delivered to recipients. After entry into a mobile communications system, the messages may be spread such that a very small number of messages end up to subscribers of one operator. Instead, all the messages enter to the network of operator controlling the entry point. Further advantageously, by stopping spam messages already on their entry into telecommunications system, it is possible to spare capacity of all involved telecommunications networks on the route from the sender to the recipient.

Figure 1:
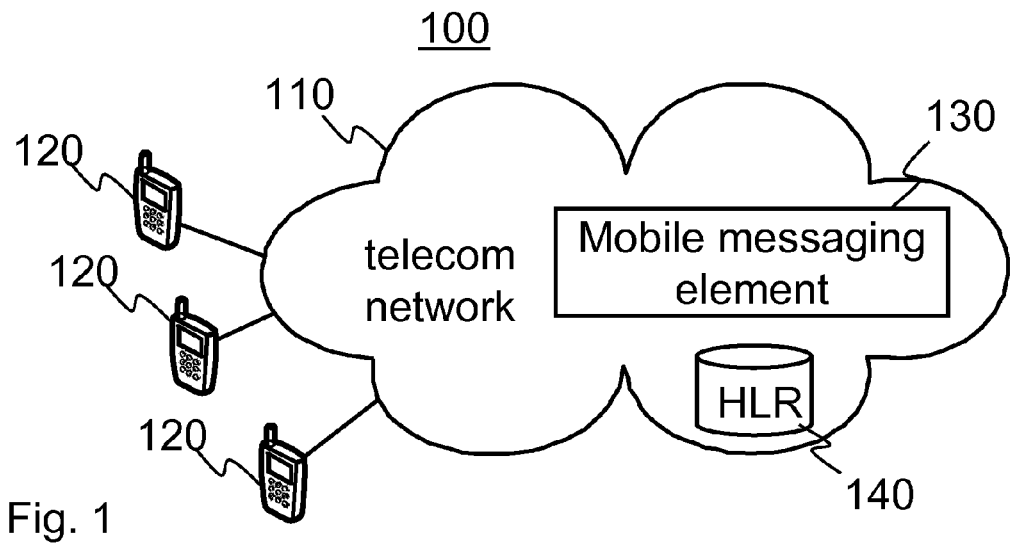
FIG. 1 shows a system according to an embodiment of the invention.

FIG. 1 shows a simplified block diagram of a telecommunications system 100 comprising a telecommunications network 110, a plurality of mobile subscribers 120 communicatively connected to the network 110 and a mobile messaging element 120. While the mobile messaging element 130 is drawn into the telecommunications network 110, it is understood that the mobile messaging element 123 may alternatively consist partly or entirely of one or more distributed elements communicatively connected to the network 110. FIG. 1 also shows a home location register (HLR) 140 known from typical public land mobile networks such as GSM. While it is a matter of implementation how the various elements in the telecommunications network 110 are realized, it may be assumed that there is a functional element that operates as the messaging element 130.

The messaging element 130 is configured to receive message transmission requests from transmitting parties such as mobile subscribers 120 or elements in common or other telecommunications networks. The operation of the messaging element according to an embodiment of the invention is next described in connection with FIG. 2.

Figure 2:
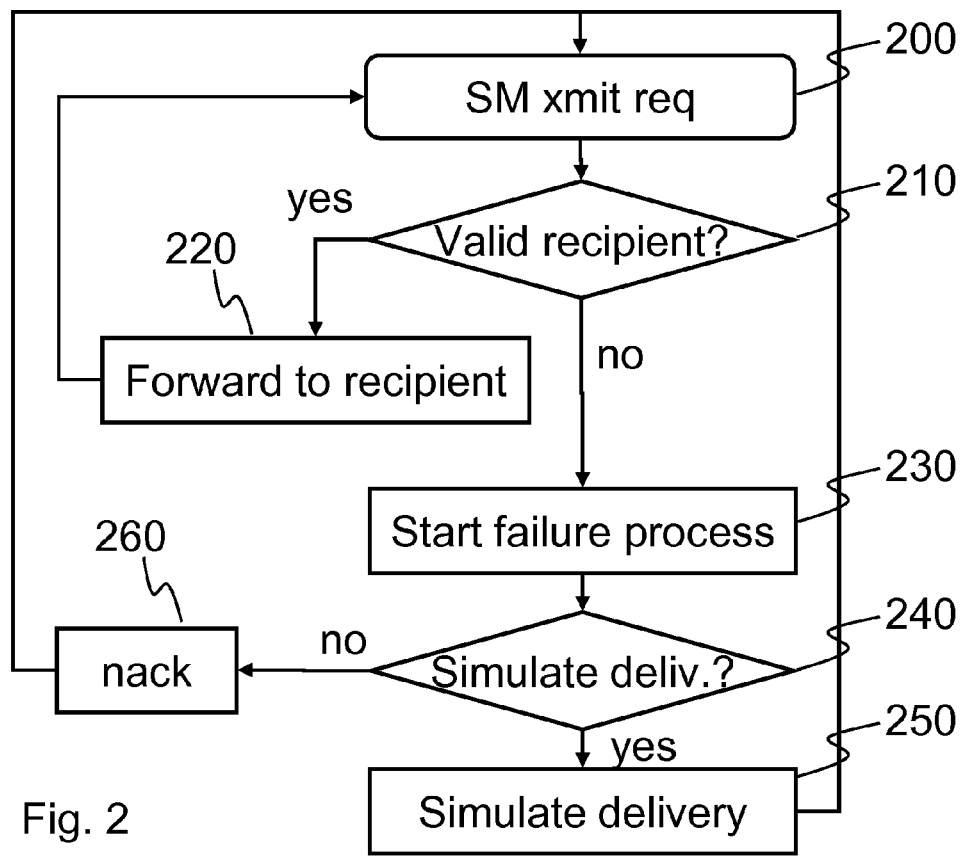
FIG. 2 shows a flow diagram according to an embodiment of the invention.

FIG. 2 shows a schematic flow chart illustrative of detecting mobile spam messages according to an embodiment of the invention. Mobile messages generally refer to messages addressed to any telecommunication network subscriber or user by a subscription number. The well-known short messaging and multimedia messaging services available for modern GSM phones are examples of mobile messages. The process shown in FIG. 2 starts from step 200 in which a short message transmission request is received from a sending element. In this connection, the sending element may either be a mobile subscriber or a fixed element. It is then checked 210 whether the recipient of the mobile message is valid or not, that is, whether an address corresponding to the recipient exists.

If the mobile message is addressed to a valid recipient, the mobile message is forwarded 220 towards the recipient. Otherwise a failure process 230 is started.

In the failure process either some or all of erroneously addressed mobile messages are processed such that the sending element will not be informed of a delivery failure. Hence, the process may involve determining 240 whether a present erroneously addressed mobile message should be subjected to simulated delivery 250 or whether normal processing 260 of a failure in transmitting the mobile message should follow (in which case the process resumes to the start at step 200).

The determining 240 whether to simulate successful delivery of a message may be based on predetermined one or more rules including, for example, one or more of the following:
a) setting of a proportion of unused numbers to be used for capturing samples of spam messages,
b) predetermined numbers having an increased likelihood of being subjected to simulation,
c) imitating normal subscription behavior by e.g. varying the response by altering attributes including the routing information and the status or by indicating that the subscriber is temporarily absent,
d) deducing likelihood that the sending element is sending malicious messages wherein the proportion of unused numbers to be used for capturing samples is heightened for prior suspected spammers. For instance, suspicions may be arose by detecting a rate of recipient addresses to an extent reaching a threshold value indicative of spam attacking to random numbers or address harvesting for determining used addresses, and
e) free resources for processing erroneously addressed messages.

After or on determining to simulate successful delivery of the mobile message, the mobile message in question and subsequent messages to the same address and/or from the same sender may also be subjected to a simulated delivery 250. In the simulated delivery 250, the sender is provided with a response mimicking ordinary responses of mobile message recipients. This mimicking may involve providing responsive communications and optionally also normal variations in the communications and in their timing and/or reliability. Moreover, it may be useful to provide the sending element with a simulated acknowledgement 240 of a successful delivery of the mobile message so as to avoid unnecessary retransmissions.

The mobile message itself may be used to update a spam filter that searches given content in the mobile messages so as to determine suspected spam messages, if the determining in step 240 is positive or in one embodiment also in case of a negative determination in step 240.

The determination of spam messages may be based on observing patterns in the erroneously addressed messages' content, size, addressing or any other characteristic. In order to filter out false alerts, ordinary message components such as web mail provider advertisements and harmless funnies, suspected spam message may be buffered until they can be cleared or sufficiently certainly detected as spam messages. Basically, any known heuristic or pattern determination techniques may be employed to determine whether any given mobile message should be a spam message or not.

Figure 3:
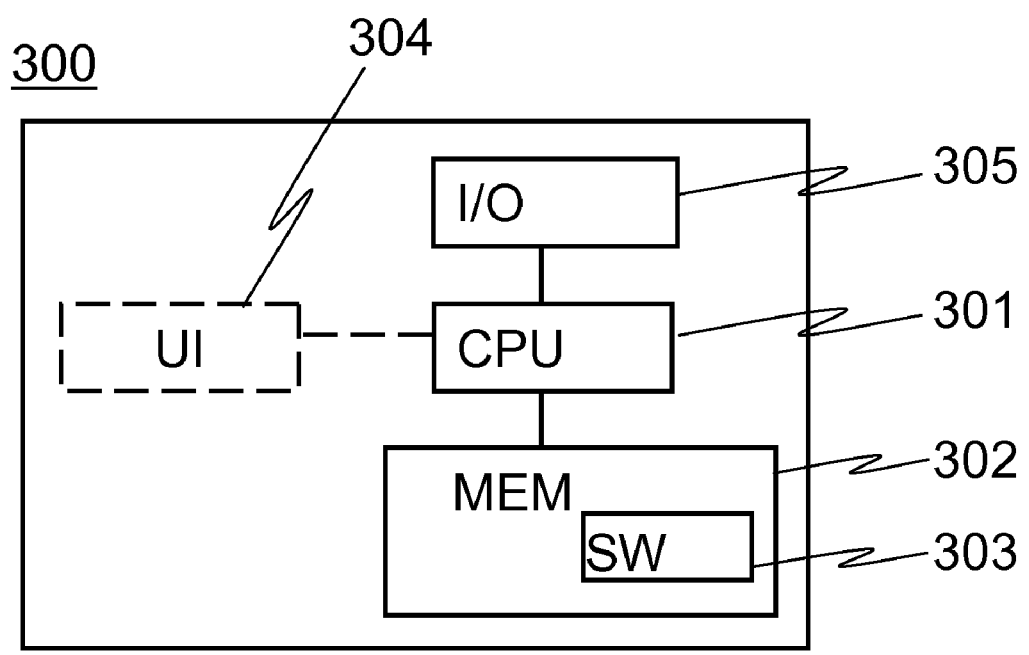
FIG. 3 shows a block diagram of some main features of an apparatus for understanding description of different embodiments of the invention.

FIG. 3 shows a block diagram of some main features of an apparatus 300 for understanding description of different embodiments of the invention. The apparatus 300 is suited for implementing various embodiments of the invention. The apparatus 300 may be a typical computer, such as a general-purpose computer or a server, with possibly distributed functions. The apparatus comprises a Central Processing Unit (CPU) 301 for controlling the apparatus and a memory 302 including computer program code or software 303.

The software 303 includes instructions for the CPU 301 to control the apparatus 300. The software may define various different functional parts such as an operating system, different computer applications, application interfaces and/or device drivers. The software 303 may comprise instructions for controlling the apparatus to provide some functionality of the invention. The instructions may for example control the apparatus to operate as a service provisioning system according to some embodiments of the invention. The apparatus 300 further comprises an I/O (input/output) unit 304 such as a LAN (Local Area Network), Ethernet, WLAN (Wireless LAN), or Asynchronous Transfer Mode (ATM) communication unit. The apparatus 300 may further comprise a user interface 305 (drawn with dashed line) such as a display and a keyboard. It is appreciated that a user interface may additionally or alternatively be implemented by means of a remote connection through the I/O unit 304.

It should be appreciated that in this document, words comprise, include and contain are each used as open-ended expressions with no intended exclusivity.

The subject matter of the appended abstract is incorporated into this description as description of particular embodiments.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

We claim:

1. In a mobile communication network, a method for detecting unsolicited spam messages, comprising:
   receiving from a sender a request for routing information to send a mobile message to a recipient, the mobile message referring to a message addressed using a subscriber number of a mobile telecommunication network;
   detecting whether or not the recipient is a valid subscriber of the mobile communication network and:
   if the recipient is not a valid subscriber of the mobile communication network, then:
      simulating to the sender that the recipient is indeed a valid subscriber in order to provoke the sender to send the mobile message; and
      identifying the mobile message as a suspected spam message;
   if the recipient is a valid subscriber of the mobile communication network then:
      proceeding to deliver a normal response to the request to deliver the routing information.

2. The method according to claim 1, further comprising selectively simulating to the sender that the recipient is indeed a mobile network subscriber based on one or more predetermined criteria.

3. The method according to claim 2, wherein the predetermined criteria comprises any one or more of the following: said recipient referring to a subscriber number that belongs to a predetermined portion of unallocated subscriber numbers; said recipient referring to a subscriber number that belongs to a predetermined proportion of unallocated subscriber numbers; selectively simulating to the sender that the recipient is indeed a mobile network subscriber in a predetermined portion of the requests or routing information; and selectively simulating to the sender that the recipient is indeed a mobile network subscriber in a predetermined proportion of the requests for routing information.

4. The method according to claim 3, wherein the size of the predetermined portion is set balancing between reliable detection of unsolicited messages and avoiding false delivery reports in case of accidental misaddressing of mobile messages.

5. The method according to claim 4, wherein the simulating imitates ordinary behavior of mobile subscribers.

6. The method according to claim 4, wherein the simulating is configured to operate such that no charging or reduced charging is incurred to the sender when a mobile message is not delivered to an existing recipient.

7. The method according to claim 4, wherein the mobile message is selected from group consisting of: a message of short messaging service; multimedia messaging service; picture messaging service; and mobile instant messaging service.

8. The method according to claim 3, wherein the predetermined portion consists of a particular set of unallocated subscriber numbers or the predetermined portion is dynamically defined from among unallocated subscriber numbers.

9. The method according to claim 1, wherein the simulating imitates ordinary behavior of mobile subscribers.

10. The method according to claim 1, wherein the simulating is configured to operate such that no charging or reduced charging is incurred to the sender when a mobile message is not delivered to an existing recipient.

11. The method according to claim 1, wherein the mobile message is selected from group consisting of: a message of short messaging service; multimedia messaging service; picture messaging service; and mobile instant messaging service.

12. An apparatus for detecting unsolicited messages in a mobile communication network, comprising:
    a receiver configured to receive from a sender a request for routing information for sending a mobile message to a recipient, the mobile message referring to a message addressed using a subscriber number of a mobile telecommunication network;
    a processor configured to detect whether the recipient is an existing mobile communication network subscriber and:
       if the recipient is not a valid subscriber of the mobile communication network, to simulate to the sender that the recipient is indeed a mobile communication network subscriber in order to provoke the sender to send the mobile message and to identify the mobile message as a suspected spam message;
       if the recipient is a valid subscriber of the mobile communication network, to proceed to deliver a normal response to the request to deliver the routing information.

13. The apparatus according to claim 12, wherein the processor is further configured to selectively simulate to the sender that the recipient is indeed a mobile network subscriber based on one or more predetermined criteria.

14. The apparatus according to claim 13, wherein the predetermined criteria comprises any one or more of the following: said recipient referring to a subscriber number that belongs to a predetermined portion of unallocated subscriber numbers; said recipient referring to a subscriber number that belongs to a predetermined proportion of unallocated subscriber numbers; selectively simulating to the sender that the recipient is indeed a mobile network subscriber in a predetermined portion of the requests or routing information; and selectively simulating to the sender that the recipient is indeed a mobile network subscriber in a predetermined proportion of the requests for routing information.

15. The apparatus according to claim 14, wherein the size of the predetermined portion is set balancing between reliable detection of unsolicited messages and avoiding false delivery reports in case of accidental misaddressing of mobile messages.

16. The apparatus according to claim 15, wherein the simulating imitates ordinary behavior of mobile subscribers.

17. The apparatus according to claim 15, wherein the simulating is configured to operate such that no charging is incurred to the sender when a mobile message is not delivered to an existing recipient.

18. The apparatus according to claim 15, wherein the mobile message is selected from group consisting of: a message of short messaging service; multimedia messaging service; picture messaging service; and mobile instant messaging service.

19. The apparatus according to claim 14, wherein the predetermined portion consists of a particular set of unallocated subscriber numbers or the predetermined portion is dynamically defined from among unallocated subscriber numbers.

20. The apparatus according to claim 14, wherein the simulating imitates ordinary behavior of mobile subscribers.

21. The apparatus according to claim 14, wherein the simulating is configured to operate such that no charging is incurred to the sender when a mobile message is not delivered to an existing recipient.

22. The apparatus according to claim 14, wherein the mobile message is selected from group consisting of: a message of short messaging service; multimedia messaging service; picture messaging service; and mobile instant messaging service.

23. A computer program stored in a non-transient computer readable medium, the computer program comprising computer executable program code adapted to cause an apparatus to implement:

receiving from a sender a request for routing information to send a mobile message to a recipient, the mobile message referring to a message addressed using a subscriber number of a mobile telecommunication network;

detecting whether or not the recipient is a valid subscriber of the mobile communication network and:

if the recipient is not a valid subscriber of the mobile communication network, then:

simulating to the sender that the recipient is indeed a valid subscriber in order to provoke the sender to send the mobile message; and identifying the mobile message as a suspected spam message;

if the recipient is a valid subscriber of the mobile communication network then:

proceeding to deliver a normal response to the request to deliver the routing information.

\* \* \* \* \*